(12) United States Patent
Fujisawa et al.

(10) Patent No.: US 8,922,429 B2
(45) Date of Patent: Dec. 30, 2014

(54) SATELLITE NAVIGATION DEVICE

(75) Inventors: Naomi Fujisawa, Nishinomiya (JP); Katsuo Yamada, Nishinomiya (JP); Yoji Goto, Nishinomiya (JP); Hiraku Nakamura, Nishinomiya (JP)

(73) Assignee: FURUNO Electric Company Limited, Nishinomiya, Hyogo-Pref. (JP)

( * ) Notice: Subject to any disclaimer, the term of this patent is extended or adjusted under 35 U.S.C. 154(b) by 884 days.

(21) Appl. No.: 13/126,434

(22) PCT Filed: Oct. 26, 2009

(86) PCT No.: PCT/JP2009/068333
§ 371 (c)(1),
(2), (4) Date: Apr. 27, 2011

(87) PCT Pub. No.: WO2010/050433
PCT Pub. Date: May 6, 2010

(65) Prior Publication Data
US 2011/0205116 A1 Aug. 25, 2011

(30) Foreign Application Priority Data
Oct. 28, 2008 (JP) ................................. 2008-276842

(51) Int. Cl.
*G01S 19/37* (2010.01)
*G01S 19/43* (2010.01)
*G01S 19/32* (2010.01)

(52) U.S. Cl.
CPC *G01S 19/32* (2013.01); *G01S 19/43* (2013.01)
USPC .................................................... 342/357.77

(58) Field of Classification Search
CPC ......... G01S 19/32; G01S 19/43; G01S 19/44; G01S 19/07; G01S 19/41
USPC .............. 342/357.77, 357.66, 357.68, 357.41
See application file for complete search history.

(56) References Cited

U.S. PATENT DOCUMENTS

| 5,471,217 A | 11/1995 | Hatch et al. |
| 6,198,430 B1 * | 3/2001 | Hwang et al. ............ 342/357.27 |
| 2004/0213329 A1 * | 10/2004 | Yano et al. .................... 375/142 |
| 2010/0103988 A1 * | 4/2010 | Martin et al. ................. 375/150 |

FOREIGN PATENT DOCUMENTS

| JE | 2007-278708 A | 10/2007 |
| JP | 6-289116 A | 10/1994 |
| JP | 2002-196060 A | 7/2002 |
| JP | 2006-10573 A | 1/2006 |
| JP | 2008-51567 A | 3/2008 |

* cited by examiner

*Primary Examiner* — Harry Liu
(74) *Attorney, Agent, or Firm* — Birch, Stewart, Kolasch & Birch, LLP

(57) ABSTRACT

A pseudo range is corrected with high accuracy using a pseudo range correction method that incorporates carrier smoothing. A code pseudo range correction unit (19) performs carrier smoothing of an L1 code pseudo range ($PR_{L1}(i)$) by the temporal change ($\Delta ADR_{L1}(i)$) in an L1 carrier phase, and performs carrier correction of a code ionosphere delay ($I_{PRL1}(i)$) by the temporal change ($\Delta I_{ADRL1}(i)$) in a carrier ionosphere delay. The code pseudo range correction unit (19) performs ionosphere delay correction by subtracting the corrected ionosphere delay ($I'_{L1}sm(i)$) from the L1 code pseudo range ($PR_{L1}sm(i)$) after smoothing processing. At this time, a direction of the delay in the temporal change ($\Delta I_{ADRL1}(i)$) in the carrier ionosphere delay included in the temporal change ($\Delta ADR_{L1}(i)$) in the L1 carrier phase is matched with a direction of the delay in the temporal change ($\Delta I_{ADRL1}(i)$) in the carrier ionosphere delay used to calculate the corrected ionosphere delay ($I'_{L1}sm(i)$).

3 Claims, 3 Drawing Sheets

SATELLITE NAVIGATION DEVICE

TECHNICAL FIELD

The present invention relates to a satellite navigation device for performing positioning and generation of a reference signal based on a satellite signal from a navigation satellite.

BACKGROUND OF THE INVENTION

Currently, there are various kinds of satellite navigation devices that perform positioning and generation of a reference signal such as 1PPS by using the GNSS (Global Navigation Satellite System). In such satellite navigation devices, the positioning and the generation of the reference signal are performed based on navigation signals from a plurality of navigation satellites. Here, since the GNSS includes a plurality of systems controlled by different administrators, a case of the GPS (Global Positioning System) is described below as an example.

In the GPS, an L1 wave and an L2 wave having frequencies different from each other are carrier waves to which a pseudo-noise code and a navigation message are overlaid. Accordingly, each of the GPS satellites generates a GPS signal. Hereinafter, the GPS signal using the L1 wave is referred to as an L1 signal and the GPS signal using the L2 wave is referred to as an L2 signal. In each of the GPS satellites, the L1 signal in synchronization with the L2 signal goes on the air. The satellite navigation device receives the synchronized signal.

The satellite navigation device calculates a pseudo range P for each GPS satellite based on the pseudo-noise code upon receiving the GPS signal and estimates a position and a receiver time error based on the pseudo range P. In this estimate operation, precision of the pseudo range affects precision of a result of, for example, the positioning. However, since the pseudo range has a margin of error, correction processing for correcting the pseudo range becomes essential in order to achieve, for example, positioning with high precision. Currently, various kinds of correction processing for correcting the pseudo range are proposed, for example a method of smoothing the pseudo range with a carrier phase and a method of correcting the pseudo range with the ionosphere delay.

For example, in Patent Document 1, after an ionosphere delay amount of the L1 signal is calculated based on the pseudo range of the L1 signal and the pseudo range of the L2 signal to smoothen the ionosphere delay amount, the smoothened amount is differentiated from the pseudo range of the L1 signal. Accordingly, the ionosphere delay correction is performed.

In Patent Document 2, an ionosphere-free code pseudo range is calculated based on the pseudo range of the L1 signal and the pseudo range of the L2 signal, and an ionosphere-free carrier phase is calculated based on a carrier phase of the L1 signal and a carrier phase of the L2 signal. Then, the ionosphere-free carrier phase is differentiated from the ionosphere-free code pseudo range to smoothen the resulting value for the correction.

In addition to the above, there is another method that performs typical carrier smoothing. In this case, the ionosphere delay amount after the carrier smoothing is differentiated from the pseudo range after the carrier smoothing, thereby achieving the ionosphere delay correction of the pseudo range.

Patent Document 1: JP2008-51567A
Patent Document 2: JP2007-278708A

SUMMARY OF THE INVENTION

Problems to be Solved by the Invention

However, in the method using the above described carrier smoothing, there is a possible problem as described below and thus, despite that the calculated pseudo range is corrected, the calculated value comes gradually away from a true pseudo range as illustrated in the below described FIG. 3.

In the carrier smoothing of the pseudo range according to a typical one frequency channel, an operation represented by Equation (1) is performed, in which a current smoothened pseudo range is PRsm(i), a current observed pseudo range is PR(i), a previous smoothened pseudo range is PRsm(i−1), a time variation amount of an observed carrier phase from the previous to current is $\Delta ADR(i)$, and a weighting coefficient is k.

$$PRsm(i) = \frac{1}{k}PR(i) + \frac{k-1}{k}(PRsm(i-1) + \Delta ADR(i)) \quad \text{Equation (1)}$$

In the carrier smoothing (the carrier correction) of the typical code ionosphere delay, an operation represented by Equation (2) is performed, in which a current smoothing ionosphere delay is Ism(i), the ionosphere delay according to the current observed pseudo range is $I_{PR}(i)$, a previous smoothened ionosphere delay is Ism(i−1), a variation amount of the ionosphere delay amount according to the observed carrier phase from the previous to current is $\Delta I_{ADR}(i)$, and the weighting coefficient is k similar to the case of the pseudo range.

$$Ism(i) = \frac{1}{k}I_{PR}(i) + \frac{k-1}{k}(Ism(i-1) + \Delta I_{ADR}(i)) \quad \text{Equation (2)}$$

As described above, after both of the pseudo range and the ionosphere delay relating to a code are smoothened, the ionosphere delay correction for the pseudo range is performed by subtracting the smoothened pseudo range PRsm(i) from the smoothened ionosphere delay Ism(i). In other words, the above corresponds to an execution of subtracting Equation (2) from Equation (1) to further perform an operation of Equation (3).

$$PRsm(i) - Ism(i) = \frac{1}{k}(PR(i) - I_{PR}(i)) + \frac{k-1}{k}(PRsm(i-1) - Ism(i-1) + \Delta ADR(i) - \Delta I_{ADR}(i)) \quad \text{Equation (3)}$$

Here, since an effect of the ionosphere to the carrier phase works in a direction where a short pseudo range is observed, the time variation amount $\Delta ADR(i)$ of the carrier phase is represented by Equation (4) based on the time variation amount $\Delta r(i)$ of a true range between the navigation satellite and the receiver (the satellite navigation device) and the time variation amount $\Delta I_{ADR}(i)$ of the ionosphere delay amount.

$$\Delta ADR(i) = \Delta r(i) - \Delta I_{ADR}(i) \quad \text{Equation (4)}$$

When Equation (4) is substituted by Equation (3), Equation (5) is obtained.

$$PRsm(i) - Ism(i) = \frac{1}{k}(PR(i) - I_{PR}(i)) + \frac{k-1}{k}(PRsm(i-1) - Ism(i-1) + \Delta r(i) - 2 \cdot \Delta I_{ADR}(i)) \quad \text{Equation (5)}$$

As shown in Equation (5), $PR(i)-I_{PR}(i)$ and $PRsm(i-1)-Ism(i-1)$ are terms that the ionosphere delay is removed from the pseudo range including an effect of the ionosphere delay. Further, $\Delta r(i)$ is the time variation amount of the true range between the satellite and the receiver without the ionosphere delay. Accordingly, the right-hand side of the Equation (5) is composed of the sum of the term of $\{PR(i)-I_{PR}(i)\}$ and the term of $\{PRsm(i-1)-Ism(i-1)\}$, in which the ionosphere delay is corrected, and a term of $\{-2\times\Delta I_{ADR}(i)\}$. Therefore, the effect of the ionosphere delay cannot be removed.

Therefore, in the method combined with the typical carrier smoothing, despite of the correction of the ionosphere delay, the right-hand side does not become a term of only the pseudo range but becomes a term always added with $-2\Delta I_{ADR}(i)$, and resulting in being a value shifted from a true pseudo range. Since such a term is added at every calculation of the pseudo range, the pseudo range which is supposed to have been corrected further comes away from the true pseudo range.

To resolve the above problem, the present invention is directed to a satellite navigation device that can correct a pseudo range with high precision even with a method of correcting the pseudo range combined with the carrier smoothing.

Means for Solving the Problem

The invention relates to satellite navigation device for calculating a code pseudo range based on a navigation signal from a navigation satellite. The satellite navigation device includes a pseudo range correction module for correcting the code pseudo range that is smoothened based on a carrier phase, by performing an ionosphere delay correction with a code ionosphere delay. The pseudo range correction means matches a direction of a carrier ionosphere delay contained in the carrier phase with a direction of the code ionosphere delay to correct the code pseudo range.

Further, the pseudo range correction module of the satellite navigation device according to the invention may match the direction of the carrier ionosphere delay contained in the carrier phase with the direction of the code ionosphere delay by, specifically, matching a shifting direction of the carrier phase due to a first carrier ionosphere delay contained in the carrier phase used in smoothing with a correction direction of a second carrier ionosphere delay for a carrier correction of the code ionosphere delay used in the ionosphere delay.

In this configuration, since the shifting direction of the carrier phase due to the first carrier ionosphere delay contained in the carrier phase when the code pseudo range is smoothened with the carrier phase matches the correction direction of the second carrier ionosphere delay for the carrier correction of the code ionosphere delay, numerical numbers and symbols in the operation equations of the first carrier ionosphere delay and the second carrier ionosphere delay mathematically match with each other. Therefore, when the ionosphere delay correction is performed by subtracting the code ionosphere delay after the carrier correction with the carrier ionosphere delay from the code pseudo range after smoothened with the carrier phase, the first carrier ionosphere delay contained in the carrier phase for smoothing is balanced out with the second carrier ionosphere delay for the carrier correction of the code ionosphere delay. Accordingly, an effect of the ionosphere delay is removed from the code pseudo range after the correction thereof by the pseudo range correction module.

Further, the satellite navigation device according to the invention may include a positioning operation module for performing a positioning operation by using the code pseudo range corrected by the pseudo range correction module.

In this configuration, the code pseudo range corrected with high precision as described above is used, thereby a positioning result can be obtained with high precision.

Further, the satellite navigation device according to the invention may further include a reference signal generation module for generating a reference clock signal by using a clock offset obtained by the positioning operation.

In this configuration, the above described positioning operation is performed with high precision, and therefore, a high-precision clock offset can be obtained. As a result, a high-precision reference signal can be generated.

Effect of the Invention

According to the aspects of the present invention, the code pseudo range without the effect of the ionosphere delay can be obtained with high precision.

BEST MODE FOR CARRYING OUT THE INVENTION

A satellite navigation device of a present embodiment is described below with reference to the accompanying drawings. In the following description, the GPS is described as an example; however, the following configuration and processing can be applied also to the other GNSS.

FIG. 1A is a block diagram illustrating main components of a satellite navigation device 1 of this embodiment. FIG. 1B is a block diagram illustrating main components of a code pseudo range correction module 19 illustrated in FIG. 1A.

As illustrated in FIG. 1, the satellite navigation device 1 of this embodiment includes an L1 receiving module 11, an L2 receiving module 12, an L1 pseudo range calculation module 13, an L1 carrier phase calculation module 14, an L2 pseudo range calculation module 15, an L2 carrier phase calculation module 16, a code ionosphere delay calculation module 17, a carrier ionosphere delay calculation module 18, a code pseudo range correction module 19, and a positioning operation module 20.

The L1 receiving module 11 receives a navigation signal received by an antenna 100 from a navigation satellite to demodulate it, outputs, for example, a navigation message to the L1 pseudo range calculation module 13, and outputs carrier phase information to the L1 carrier phase calculation module 14. The L2 receiving module 12 receives the navigation signal received by the antenna 100 from a positioning satellite to demodulate it, outputs, for example, a navigation message to the L2 pseudo range calculation module 15, and outputs carrier phase information to the L2 carrier phase calculation module 16.

The L1 pseudo range calculation module 13 calculates an L1 code pseudo range $PR_{L1}(i)$ at a predetermined time cycle based on, for example, the navigation message. The L1 code pseudo range $PR_{L1}(i)$ is outputted to the code ionosphere delay calculation module 17 and the code pseudo range correction module 19.

The L2 pseudo range calculation module 15 calculates an L2 code pseudo range $PR_{L1}(i)$ concurrently with each piece of information of the L1 based on, for example, the navigation message. The L2 code pseudo range $PR_{L2}(i)$ is outputted to the code ionosphere delay calculation module 17.

The L1 carrier phase calculation module 14 calculates an L1 carrier phase $ADR_{L1}(i)$ concurrently with the code pseudo range $PR_{L1}(i)$ based on the carrier phase information of the L1 signal. The L1 carrier phase $ADR_{L1}(i)$ is outputted to the carrier ionosphere delay calculation module 18 and the code pseudo range correction module 19.

The L2 carrier phase calculation module 16 calculates an L2 carrier phase $ADR_{L1}(i)$ concurrently with the code pseudo range $PR_{L1}(i)$ based on the carrier phase information of the L2 signal. The L2 carrier phase $ADR_{L1}(i)$ is outputted to the carrier ionosphere delay calculation module 18.

The code ionosphere delay calculation module 17 calculates an L1 code ionosphere delay $I_{PRL1}(i)$ at each timing by using the following Equation (6).

$$I_{PRL1}(i) = \frac{f_{L2}^2}{f_{L1}^2 - f_{L2}^2}(PR_{L2}(i) - PR_{L1}(i)) \qquad \text{Equation (6)}$$

The carrier ionosphere delay calculation module 18 calculates a time variation amount $\Delta I_{ADRL1}(i)$ of the carrier ionosphere delay at each timing by using the following Equation (7).

$$\Delta I_{ADRL1}(i) = \frac{f_{L2}^2}{f_{L1}^2 - f_{L2}^2}(\lambda_{L1} \cdot \Delta ADR_{L1}(i) - \lambda_{L2} \cdot \Delta ADR_{L2}(i)) \qquad \text{Equation (7)}$$

Here, $\lambda_{L1}$ and $\lambda_{L2}$ are a wavelength of the L1 signal and a wavelength of the L2 signal, respectively. $\Delta ADR_{L1}(i)$ represents a time variation amount of the L1 carrier phase $ADR_{L1}(i)$ from one timing before to current and $\Delta ADR_{L2}(i)$ represents a time variation amount of the L2 carrier phase $ADR_{L2}(i)$ from one timing before to current.

The code ionosphere delay $I_{PRL1}(i)$ calculated in the code ionosphere delay calculation module 17 and the time variation amount $\Delta I_{ADRL1}(i)$ of the carrier ionosphere delay calculated in the carrier ionosphere delay calculation module 18 are outputted to the code pseudo range correction module 19.

The code pseudo range correction module 19 includes a code pseudo range carrier smoothing module 191, a code ionosphere delay carrier correction module 192, and a code pseudo range ionosphere correction module 193. The code pseudo range correction module 19 corrects the L1 code pseudo range $PR_{L1}(i)$ by using the following principle and outputs the resulting value to the positioning operation module 20.

The code pseudo range carrier smoothing module 191 performs the carrier smoothing for the L1 code pseudo range $PR_{L1}(i)$ by using a weighting average obtained by the above Equation (1). In other words, the code pseudo range carrier smoothing module 191 calculates an L1 code pseudo range $PR_{L1}sm(i)$ after the smoothing processing by using the following Equation (8).

$$PR_{L1}sm(i) = \frac{1}{k}PR_{L1}(i) + \frac{k-1}{k}(PR_{L1}sm(i-1) + \Delta ADR_{L1}(i)) \qquad \text{Equation (8)}$$

Here, the $PR_{L1}sm(i)$ is the L1 code pseudo range after the smoothing processing at a current timing, the $PR_{L1}sm(i-1)$ is the L1 code pseudo range after the smoothing processing at one timing before, and k is a constant for determining a weight and can be changed according to a specification.

The code ionosphere delay carrier correction module 192 performs a carrier correction for the code ionosphere delay $I_{PRL1}(i)$ by using the following Equation (9). In other words, the code ionosphere delay carrier correction module 192 calculates the code ionosphere delay $I'_{L1}sm(i)$ after the carrier correction by using the Equation (9).

$$I'_{L1}sm(i) = \frac{1}{k}I_{PRL1}(i) + \frac{k-1}{k}(I'_{L1}sm(i-1) - \Delta I_{ADRL1}(i)) \qquad \text{Equation (9)}$$

Here, as represented by the Equation (9), in the present invention, the carrier correction is performed according to an operation different from the carrier smoothing of the typical code ionosphere delay represented by the above described Equation (2). More specifically, when correcting the code ionosphere delay, the operation is performed, in which the code ionosphere delay $I'_{L1}sm(i-1)$ after the carrier correction of one timing before is not added with the time variation $\Delta I_{ADRL1}(i)$ of the carrier ionosphere delay (a typical method) but is subtracted by the time variation $\Delta I_{ADRL1}(i)$ of the carrier ionosphere delay.

The processing is performed based on delay directions of the code ionosphere delay and the carrier ionosphere delay being different from each other. More specifically, the code ionosphere delay works in a direction where the pseudo range becomes longer while the carrier ionosphere delay works in a direction where the pseudo range becomes shorter. In view of the above, a symbol of the time variation amount $\Delta I_{ADRL1}(i)$ of the carrier ionosphere delay in the equation of the code ionosphere delay $I'_{L1}sm(i)$ after the carrier correction is inverted such that the directions match with each other.

The code pseudo range ionosphere delay correction module 193 subtracts the code ionosphere delay $I'_{L1}sm(i)$ after the carrier correction, which is calculated in the Equation (9), from the L1 code pseudo range $PR_{L1}sm(i)$ after the smoothing processing, which is calculated in the Equation (8).

$$PR_{L1}sm(i) - I'_{L1}sm(i) = \qquad \text{Equation (10)}$$
$$\frac{1}{k}(PR_{L1}(i) - I_{PRL1}(i)) + \frac{k-1}{k}(PR_{L1}sm(i-1) -$$
$$I'_{L1}sm(i-1) + \Delta ADR_{L1}(i) + \Delta I_{ADRL1}(i))$$

This equation corresponds to performing the ionosphere delay correction for the L1 code pseudo range $PR_{L1}sm(i)$ after the smoothing processing by using the ionosphere delay after the carrier correction.

Here, an effect of the ionosphere delay with respect to the carrier phase works in the direction where the pseudo range is observed short, therefore the time variation amount $\Delta ADR_{L1}(i)$ of the L1 carrier phase is represented by the following equation:

$$\Delta ADR_{L1}(i) = \Delta r(i) - \Delta I_{ADRL1}(i) \qquad \text{Equation (11)}$$

by using a time variation amount $\Delta r(i)$ of a true range between the satellite and the receiver and the time variation amount $\Delta I_{ADRL1}(i)$ of the ionosphere delay.

Therefore, by substituting the Equation (11) into Equation (10), the following (Equation (12)), meaning the L1 code pseudo range is subjected to the ionosphere delay correction with the code ionosphere delay, can be obtained.

$$PR_{L1}sm(i) - I'_{L1}sm(i) = \frac{1}{k}(PR_{L1}(i) - I_{PRL1}(i)) + \qquad \text{Equation (12)}$$
$$\frac{k-1}{k}(PR_{L1}sm(i-1) - I'_{L1}sm(i-1) + \Delta r(i))$$

In other words, the time variation amount $\Delta I_{ADRL1}(i)$ of the carrier ionosphere delay contained in the time variation amount $\Delta ADR_{L1}(i)$ of the L1 carrier phase corresponding to a first carrier ionosphere delay of the invention is balanced out with the time variation amount $\Delta I_{ADRL1}(i)$ of the carrier ionosphere delay contained in the equation of the carrier correction of the code ionosphere delay $I_{PRL1}(i)$ corresponding to a second carrier ionosphere delay of the invention.

Here, the term of $(1/k) \times (PR_{L1}(i) - I_{PRL1}(i))$ in the right-hand side of Equation (12) corresponds to performing the ionosphere delay correction for the current L1 code pseudo range $PR_{L1}(i)$ by using the current code ionosphere delay $I_{PRL1}(1)$. Similarly, the term of $((k-1)/k) \times (PR_{L1}sm(i-1) - I'_{L1}sm(i-1))$ corresponds to correcting the L1 code pseudo range $PR_{L1}sm(i-1)$ after the smoothing processing of one timing before by using the ionosphere delay $I'_{L1}sm(i-1)$ after the carrier correction of one timing before.

As described above, by performing the operation as represented by the Equation (12), even if the ionosphere delay correction is performed with the carrier-corrected ionosphere delay after the L1 code pseudo range is subjected to the carrier smoothing, an effect of the time variation amount $\Delta I_{ADRL1}(i)$ of the carrier ionosphere delay does not remain as represented by the conventional Equation (5) and thus an effect of the time variation amount $\Delta I_{ADRL1}(i)$ of the carrier ionosphere delay with respect to the corrected L1 code pseudo range can be removed.

In the above description, such an example is described that the code pseudo range correction module 19 includes the code pseudo range carrier smoothing module 191, the code ionosphere delay carrier correction module 192, and the code pseudo range ionosphere delay correction module 193, and that the L1 pseudo range calculation module 13, the L1 carrier phase calculation module 14, the L2 pseudo range calculation module 15, the L2 carrier phase calculation module 16, the code ionosphere delay calculation module 17, and the carrier ionosphere delay calculation module 18 are independent functional modules. However, these modules may serve as a single code pseudo range generation module to correct the code pseudo range according to the flow described as follows.

FIG. 2 is a flowchart illustrating a flow of correction processing of the code pseudo range of the satellite navigation device 1 of this embodiment.

Firstly, the code pseudo range generation module calculates the L1 code pseudo range $PR_{L1}(i)$ and the L2 code pseudo range $PR_{L2}(i)$ at every predetermined timing based on, for example, the navigation message (S101).

The code pseudo range generation module calculates the L1 carrier phase $ADR_{L1}(i)$ based on the carrier phase information of the L1 signal, and calculates the L2 carrier phase $ADR_{L2}(i)$ based on the carrier phase information of the L2 signal (S102).

The code pseudo range generation module calculates the L1 code ionosphere delay $I_{PRL1}(i)$ at each timing by using the above described Equation (6) (S103). The code pseudo range generation module calculates the time variation amount $\Delta I_{ADRL1}(i)$ of the carrier ionosphere delay at each timing by using the above described Equation (7) (S104).

The code pseudo range generation module performs the ionosphere delay correction of the carrier-smoothed L1 code pseudo range $PR_{L1}$ by using the time variation amount $\Delta ADR_{L1}$ of the carrier phase, the code ionosphere delay $I_{PRL1}$, and the time variation amount $\Delta I_{ADRL1}$ of the carrier ionosphere delay, based on the above described equations (8), (9) and (10) (S105).

The effect of the time variation amount $\Delta I_{ADRL1}(i)$ of the carrier ionosphere delay can be removed even with the above processing that the L1 code pseudo range after the carrier smoothing is subjected to the ionosphere delay correction with the code ionosphere delay after the carrier correction.

FIG. 3 is a graph illustrating values of the L1 code pseudo range in the respective cases where the method of this embodiment is used, where the conventional method is used, and where the carrier smoothing is not performed. In FIG. 3, a horizontal axis represents a time passage and a vertical axis represents a pseudo range error from the true pseudo range.

As it is illustrated in FIG. 3, by using the method of this embodiment, the code pseudo range corrected with the ionosphere delay after the carrier smoothing and carrier correction approximately matches the true code pseudo range without the values being varied along the passage of time.

As described above, by using the configuration and the method of this embodiment, the code pseudo range can be calculated with high precision.

Thus calculated code pseudo range is applied to the positioning operation module 20. The positioning operation module 20 performs a positioning of its own device (receiver) by using the code pseudo range according to a known method. Accordingly, the positioning can be performed with high precision. Further, the positioning operation module 20 includes a reference signal generation circuit, and thereby a reference signal such as 1PPS can also be outputted. At the time, since the code pseudo range can be obtained with high precision, the clock offset of the own device (receiver) can be obtained with high precision. As a result, the reference signal can be generated with high precision.

In the configuration and the processing of this embodiment, since the code pseudo range including the ionosphere delay can be corrected with high precision, it is not necessary to use a ionosphere-free combination. Accordingly, an effective correction of the code pseudo range is achieved with respect to the satellite navigation device concurrently using a differential positioning system. In other words, in a range where differential information can be used, the ionosphere delay correction can be performed with the ionosphere delay information obtained by the differential information after the carrier smoothing of the code pseudo range. Therefore, even in a range where the differential information cannot be used, the correction of the code pseudo range can be performed with high precision by using the above described method.

In the above description, a case where the L1 code pseudo range is corrected is exemplified, the L2 code pseudo range can also be corrected in a similar manner.

DESCRIPTION OF THE NUMERICAL NUMBERS

Figure 1A:
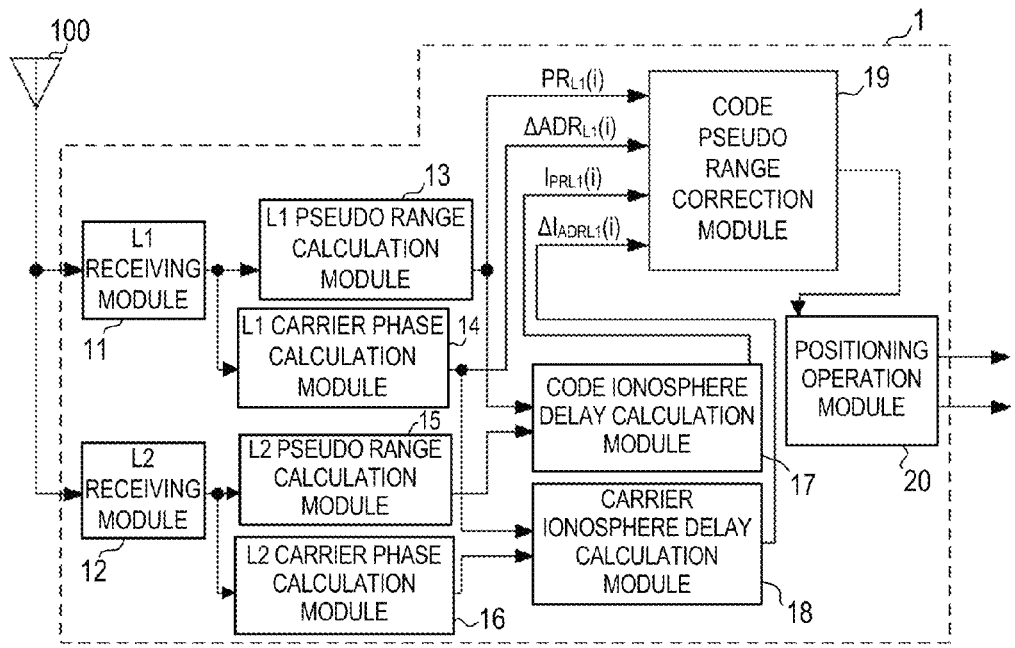
FIG. 1 includes a block diagram illustrating main components of a satellite navigation device 1 and a block diagram illustrating main components of a code pseudo range correction module 19 according to an embodiment.
Figure 1B:
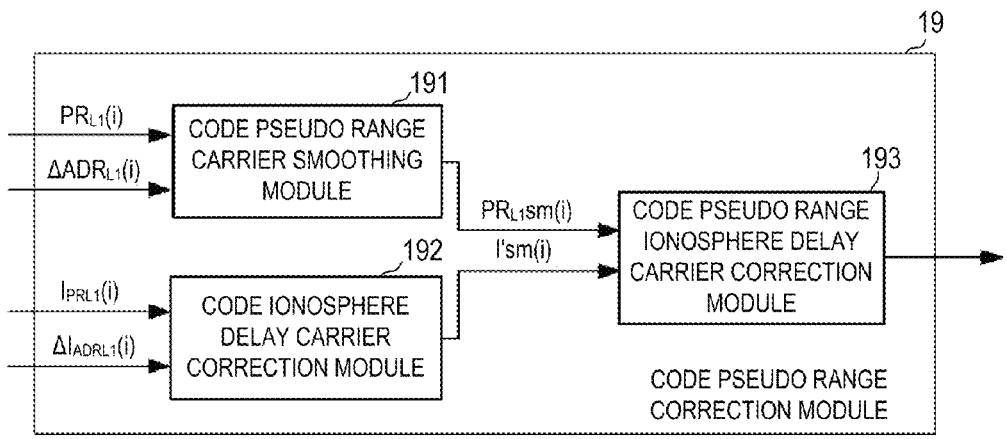
Figure 2:
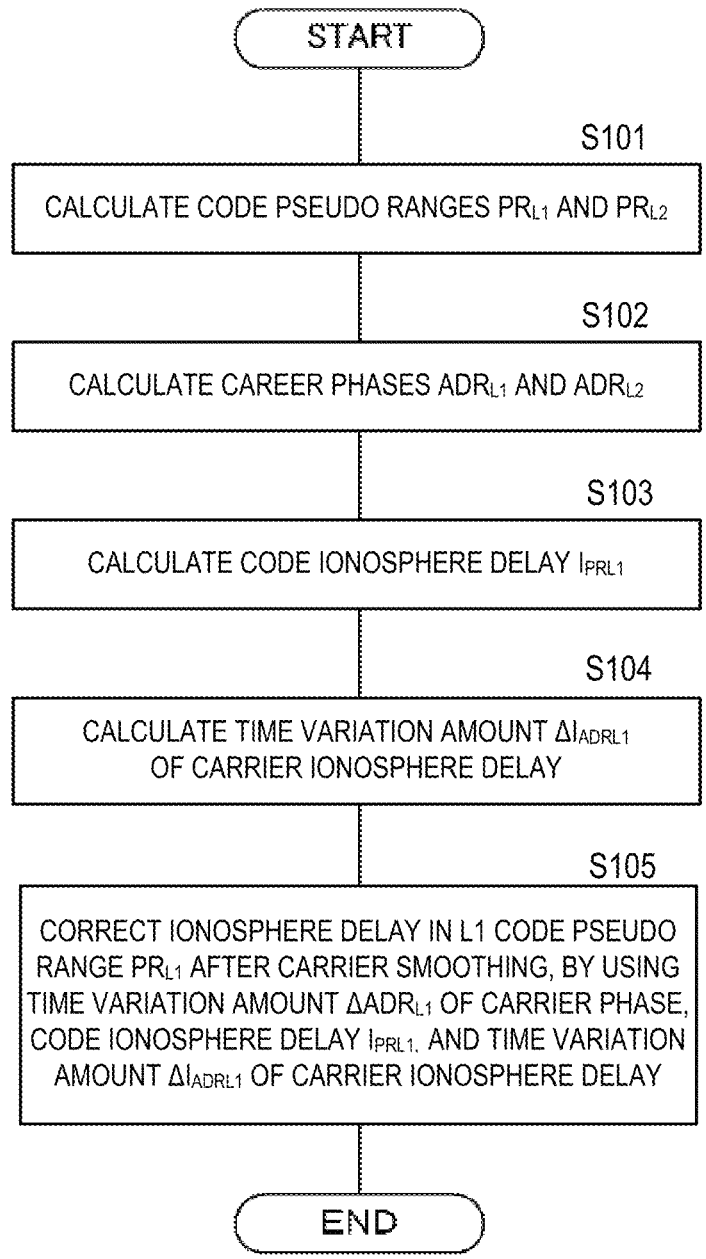
FIG. 2 is a flowchart illustrating a flow of correction processing of a code pseudo range of the satellite navigation device 1 according to the embodiment of the present invention.
Figure 3:
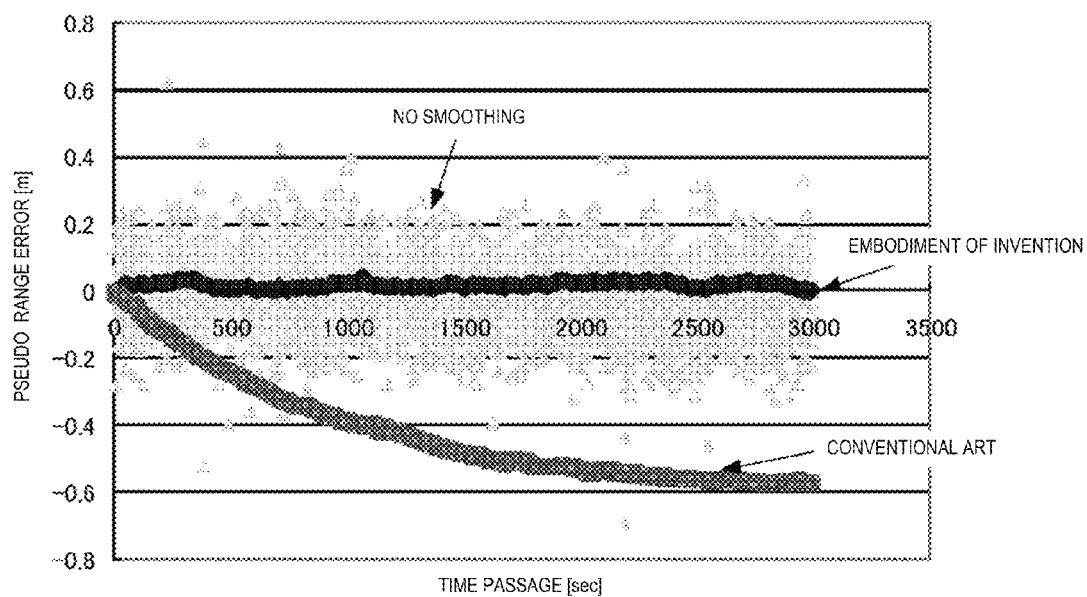
FIG. 3 is a graph illustrating values of an L1 code pseudo range of respective cases where a method of the embodiment of the present invention is used, where a conventional method is used, and where a carrier smoothing is not performed.

1: satellite navigation device; 11: L1 receiving module; 12: L2 receiving module; 13: L1 pseudo range calculation module; 14: L1 carrier phase calculation module; 15: L2 pseudo range calculation module; 16: L2 carrier phase calculation module; 17: code ionosphere delay calculation module; 13: carrier ionosphere delay calculation module; 19: code pseudo range correction module; 191: code pseudo range carrier smoothing module; 192: code ionosphere delay carrier correction module; 193: code pseudo range ionosphere delay correction module; 20: positioning operation module; 100: antenna

What is claimed is:

1. A satellite navigation device for calculating a code pseudo range based on a navigation signal from a navigation satellite, comprising:

a pseudo range correction module for correcting the code pseudo range that is smoothened based on a carrier phase, by performing an ionosphere delay correction with a code ionosphere delay, wherein the pseudo range correction module matches a direction of a carrier ionosphere delay contained in the carrier phase with a direction of the code ionosphere delay to correct the code pseudo range; and wherein the pseudo range correction module matches the direction of the carrier ionosphere delay contained in the carrier phase with the direction of the code ionosphere delay by matching a shifting direction of the carrier phase due to a first carrier ionosphere delay contained in the carrier phase used in the smoothing of the code pseudo range with a correction direction of a second carrier ionosphere delay for a carrier correction of the code ionosphere delay used in the ionosphere delay.

2. The satellite navigation device of claim 1, further comprising a positioning operation module for performing a positioning operation by using the code pseudo range corrected by the pseudo range correction module.

3. The satellite navigation device of claim 2, further comprising a reference signal generation module for generating a reference clock signal by using a clock offset obtained by the positioning operation.

* * * * *